United States Patent [19]

Vasko

[11] Patent Number: 4,565,250
[45] Date of Patent: Jan. 21, 1986

[54] HORSE SHOE PAD

[75] Inventor: Kent A. Vasko, Hinckley, Ohio

[73] Assignee: Sorbo, Inc., Twinsburg, Ohio

[21] Appl. No.: 519,989

[22] Filed: Aug. 3, 1983

[51] Int. Cl.$^4$ ............................................. A01L 7/02
[52] U.S. Cl. ...................................... 168/12; 168/28
[58] Field of Search ..................... 168/1, 2, 12, 13, 14, 168/17, 18, 26, 27, 28

[56] References Cited

U.S. PATENT DOCUMENTS

| | | | |
|---|---|---|---|
| 449,368 | 3/1891 | Kress ................................... | 168/28 |
| 745,232 | 11/1903 | Ohlson ................................ | 168/27 |
| 772,685 | 10/1904 | Symons . | |
| 777,514 | 12/1904 | Jennings et al. ...................... | 168/27 |
| 832,468 | 10/1906 | Fitzgerald ............................ | 168/28 |
| 863,386 | 8/1907 | Hallanan ............................. | 168/28 |
| 916,750 | 3/1909 | Mills .................................... | 168/26 |
| 1,050,526 | 1/1913 | Downs et al. ....................... | 168/28 |
| 1,197,602 | 9/1916 | Cassidy . | |
| 1,673,650 | 6/1928 | Tweed .............................. | 168/28 X |
| 2,705,536 | 4/1955 | Phreaner ............................ | 168/14 |
| 3,630,289 | 12/1971 | Norberg ............................ | 168/12 X |
| 4,346,205 | 8/1982 | Hiles .................................. | 528/44 X |

FOREIGN PATENT DOCUMENTS 960552 10/1962 United Kingdom .

Primary Examiner—Robert P. Swiatek
Attorney, Agent, or Firm—Maky, Renner, Otto & Boisselle

[57] ABSTRACT

A horse shoe pad is formed of a shock absorbing layer and a stabilizing fabric layer. The shock absorbing layer may be made of a dense non-cellular polyurethane of essentially linear structure containing unsatisfied hydroxyl groups, having a compression set of less than 15%, and preferably less than 5%, an elongation at break of at least 500%, a recovery after compression which is delayed by about 0.7 seconds, and a hardness on the Shore 00 scale of approximately 70. The fabric reinforcing layer may be a woven nylon fabric. In addition to these two layers, some embodiments include an additional layer of stabilizing fabric on the opposite side of the shock absorbing layer and/or layers of polyester urethane forming base and/or top layers. The pad may be used both between a plastic or a conventional metal horse shoe and the hoof, or the pad may be shaped to fit free-floatingly within the interior hoof wall and held in place only by an underlying sheet of material which is in turn secured in place by a conventional horse shoe.

20 Claims, 11 Drawing Figures

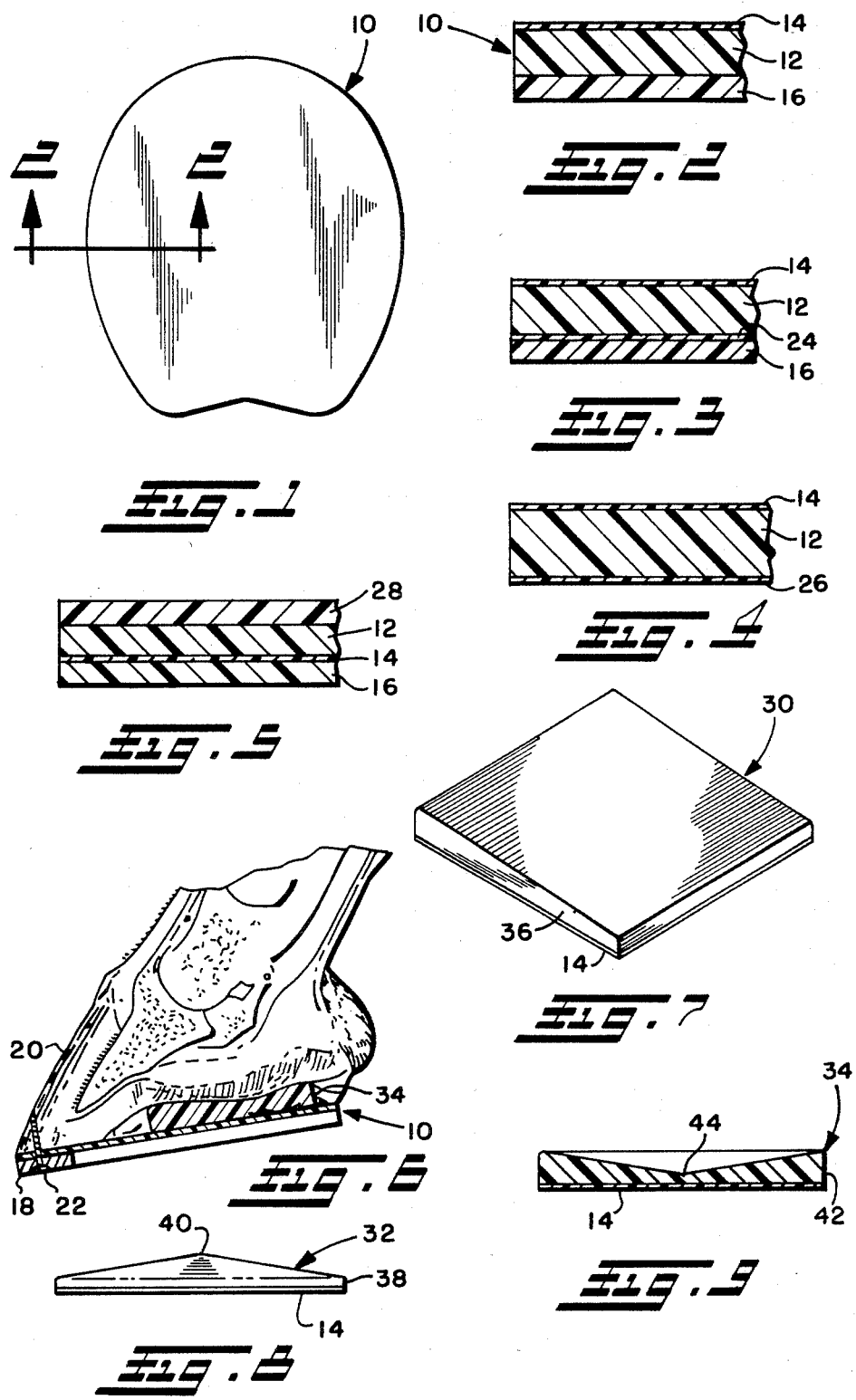

HORSE SHOE PAD

FIELD OF THE INVENTION

The present invention relates to horse shoe pads.

BACKGROUND OF THE INVENTION

In the treatment of lameness and other diseases of the musculoskeletal system of horses and other domestic animals it has been proposed to provide a resilient rubber layer between the bottom of the hoof of the animal and a shoe. Although treatments of this kind have been tried, they have not proven entirely successful both because the resilient material chosen has not been effective in reducing shock to the animal's musculoskeletal system and also because some of the resilient materials, although effective at absorbing shock, have not proven to be sufficiently dimensionally stable to hold up when placed between the shoe and hoof of a horse or other animal.

It has been known to apply orthotic devices in the form of tapering wedges under the heel portion of a hoof to elevate and support the rear or heel portion. Such wedges have in the past extended the full width of the hoof and have been secured by the same nails that hold the shoe in place.

SUMMARY OF THE INVENTION

The present invention provides a new and improved pad for use in treating shod animals. The invention comprises a pad formed of an elastomeric material of surprising shock absorbing efficiency and stabilized by a fabric molded into one surface of the elastomeric material. The pad may be essentially planar and may be used between the hoof and shoe of the animal. The pad may also have a raised or lowered center portion or may be wedge shaped. In these latter configurations, the pads are trimmed to fit freely within the hoof wall and may be used to support the frog or heel portion of the hoof. These latter pads are held in place by a sheet of material, possibly polyurethane, which is placed under the hoof and covers the bottom thereof extending rearward as far as the heel. Additionally, pads constructed in accordance with the present invention may include an additional layer or layers or stabilizing fabric and/or polyurethane which is bonded to the shock absorbing layer.

Accordingly, the present invention also provides a method of treating shod animals which includes trimming a pad to fit within the hoof wall, preferably leaving a peripheral gap to allow for lateral expansion of the pad under compression. The trimmed pad is held in place by a sheet of material which covers the entire bottom of the hoof from front to heel and which is itself held in place either by a plastic horse shoe or a conventional metal horse shoe.

The invention then comprises the features hereinafter fully described and particularly pointed out in the claims, the following description and annexed drawings setting forth in detail illustrative embodiments of the invention, these being indicative, however, of but a few of the various ways in which the principles of the present invention may be carried out.

BRIEF DESCRIPTION OF THE DRAWINGS

In the annexed drawings:

FIG. 1 is a plan view of a pad constructed in accordance with the present invention;

FIG. 2 is a view looking in the direction of arrows 2—2 of FIG. 1;

FIG. 3 is a partial sectional view of a second embodiment of the present invention;

FIG. 4 is a partial sectional view of yet another embodiment of the present invention;

FIG. 5 is a partial sectional view of yet another embodiment of the present invention;

FIG. 6 is a sectional view of a horse's hoof showing pads of the present invention in place;

FIG. 7 is a perspective illustration of yet another embodiment of the present invention;

FIG. 8 is an elevation view of a pad constructed in accordance with the present invention;

FIG. 9 is a sectional view of yet another embodiment of the present invention;

DESCRIPTION OF PREFERRED EMBODIMENTS

Figure 10:
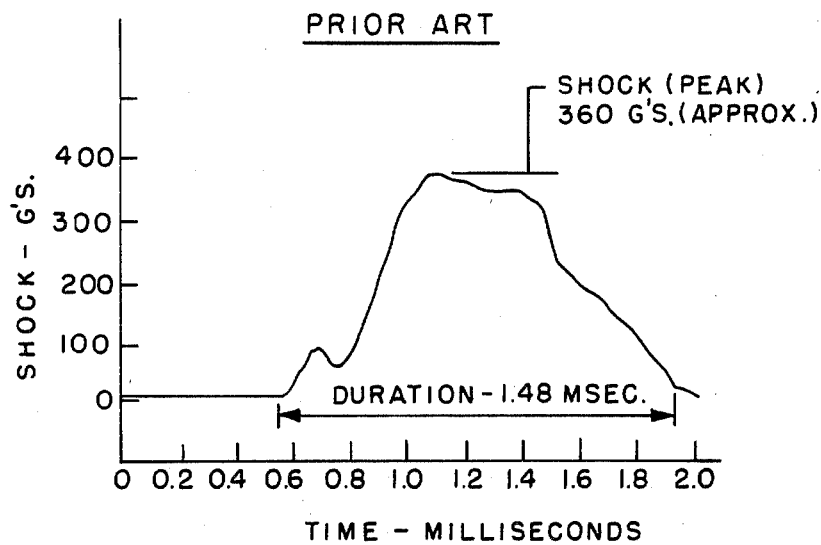
FIG. 10 is a graph illustrating the shock force applied to a horse's hoof fitted only with a conventional aluminum horse shoe.

FIG. 1 shows a plan view of a pad 10 constructed in accordance with the present invention. The pad 10 is used therapeutically for shod animals. The pad 10 has an outer periphery contoured generally to fit the hoof of a horse. Although primarily intended for horses, the pad 10 may also be used with mules, cattle, and zoo animals. For some treatments even animals not normally thought of as being shod, i.e. elephants, may be fitted with shoes and the pad of the present invention. Obviously, the outer periphery of the pad 10 would be contoured accordingly.

The pad 10 is shown in partial sectional view in FIG. 2. The pad 10 includes a central shock absorbing layer 12 of polyurethane. The central layer 12 is essentially planar and may range in thickness from approximately 0.168 to 0.178 inch in thickness. The material of which the shock absorbing layer 12 is formed is generally similar to the flexible, non-cellular polyurethane described and claimed in U.S. Pat. No. 4,346,205 which is incorporated herein by reference. This material is a modified dense polyurethane of essentially linear structure containing unsatisfied hydroxyl groups and having a compression set of less than 15% and preferably less than 5%. This polyurethane has an elongation at break of at least 500% and a recovery which is delayed after compression by at least 0.7 second.

In contrast to the polyurethane disclosed in said patent which has a hardness on the Shore 00 scale of preferably between 0 and 10, the polyurethane of the shock absorbing layer 12 has a hardness of 70±5 on the Shore 00 scale.

The pad 10 includes a top stabilizing layer 14 of fabric about 0.025 inch thick. This layer protects the pad 10 against abrasion, but also, and importantly, provides dimensional stability during compression. The fabric layer 14 may be made of nylon and one suitable material is available under the trade name CAMBRELLE. However, other fabrics may prove suitable. The fabric of the layer 14 is a "bleed through" material. During manufacture of the pad 10, the fabric layer 14 is placed in a mold, and then the polyurethane resin is poured in to form the shock absorbing layer 12. The resin bleeds through the fabric 14 forming what are essentially mechanical bonds with the fabric which serve to bond permanently the fabric layer 14 to the shock absorbing layer 12.

The pad 10 also includes a base layer 16 which is essentially planar and approximately 0.093 inch thick. The base layer 16 is formed of a pure polyester urethane, and preferably has a hardness of approximately 60 ±2 on the D scale. During manufacture the base layer 16 is placed in the mold on top of the resin for the shock absorbing layer 12. Chemical bonding then takes place between the shock absorbing layer 12 and the base layer 16 to bond them together permanently.

In use, the pad 10 is placed between a horse shoe 18 (FIG. 6) which could be either metal or plastic and the hoof 20. The pad 10 and shoe 18 are then glued or nailed in place with nails such as 22. The pad 10 may be trimmed around its perimeter to conform closely to the outside shape of the hoof either before or after nailing.

Figure 11:
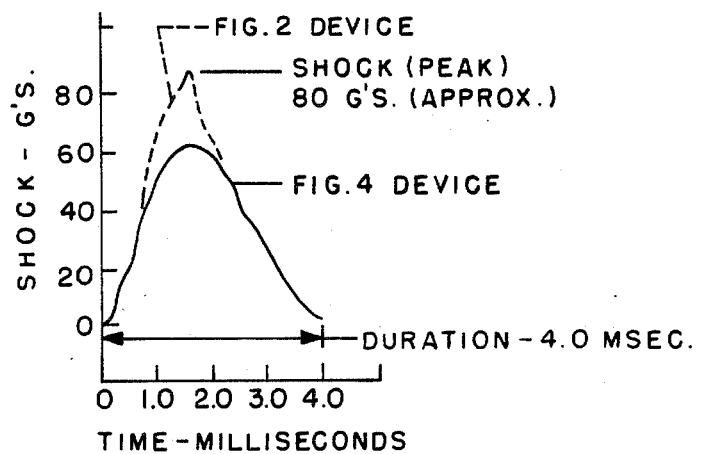
FIG. 11 is a graph illustrating the shock forces applied to horses' hooves fitted with two different pads constructed in accordance with the present invention.

The beneficial effects of using the pad 10 can be illustrated in part by a comparison of FIGS. 10 and 11. FIG. 10 shows the shock forces applied to the hoof of a horse running on a hard racetrack and fitted with conventional aluminum horse shoes. The maximum shock load is approximately 360 G's and shows substantial unevenness which represents vibration.

In FIG. 11 the dashed line illustrates the forces applied to the hoof of a horse fitted with a pad such as that illustrated in FIG. 2 and running on the same hard racetrack. In this case the maximum force was approximately 80 G's, about one quarter of the maximum seen without the pad 10. Additionally, the curve is substantially smoother, indicating that the pad 10 not only absorbs shock but also the vibrations caused thereby.

FIGS. 3, 4 and 5 show other embodiments of the present invention and the same reference numerals have been used to indicate corresponding parts. FIG. 3 illustrates a pad having a shock absorbing layer 12, an upper stabilizing fabric layer 14, a polyester urethane base layer 16 about 0.093 inch thick and an additional stabilizing layer 24 of the same fabric as the upper stabilizing layer 14. The shock absorbing layer 12 in FIG. 3 is thicker than in the FIG. 2 embodiment, being about 0.188 inch thick. The additional stabilizing layer 24 is located between the base layer 16 and the shock absorbing layer 12. The pad illustrated in FIG. 3 is especially suited to applications in which the hoof is subjected to large torques, as, for instance, by quarter horses or cutting horses.

The embodiment illustrated in FIG. 4 includes a shock absorbing layer 12, an upper fabric stabilizing layer 14 and a lower fabric stabilizing layer 26. Additionally, the shock absorbing layer 12 is thicker than in the previous embodiments, being up to ¼ inch thick. The pad illustrated in FIG. 4 is especially suited for use on horses which, because of disease, are not engaging in vigorous activity but which need the maximum possible amount of shock absorbing protection.

The pad illustrated in FIG. 5 is especially suited for active horses where large impacts occur. The pad shown in FIG. 5 includes a central shock absorbing layer 12 with a stabilizing layer of fabric 14 bonded to the lower side thereof. Below the fabric layer 14 is a polyester urethane base layer 16, and an additional polyester urethane layer 28 is bonded to the top side of the shock absorbing layer 12. Both the polyester urethane layers 16 and 28 are about 0.093 inch thick.

Additional testing was conducted to determine the efficiency of the pads illustrated in FIGS. 2-5. The testing was conducted by dropping a 35 lb. metal ball onto these pads which were supported on a horizontal surface of a massive concrete block. The height from which the ball was dropped was selected to simulate a 2,000 lb. impact force. The ball was fitted with and accelerometer to measure forces during impact. From these data it was possible to compute the ratio between the energy of the ball before impact and after, and therefore the energy absorbing efficiency of the pads. The pad illustrated in FIG. 2 had an efficiency of between 58 and 60% depending upon the thickness of the shock absorbing layer 12. The pad illustrated in FIG. 3 had an efficiency of approximately 56%. The pad illustrated in FIG. 4 had an efficiency of between 66 and 68%, again depending upon the thickness of the shock absorbing layer 12. The pad illustrated in FIG. 6 had an efficiency of approximately 48%. For purposes of comparison, three additional pads were tested. One is a commercially available horse shoe pad sold under the brand name FLEX STEP. It is believed this pad is made of an impure polyurethane. It had an efficiency of approximately 9%. A pad formed entirely of the material used to form the shock absorbing layer 12 and approximately 0.1875 inch thick had an efficiency of 72%, while the polyester urethane used to form the base layers 16 and 28 had an efficiency of approximately 6% when a layer 0.093 inch thick was tested.

Similar tests were conducted with the same ball mounted as the weight of a pendulum to strike a vertical surface of a concrete block to which various pads were secured. The length of the pendulum was selected to simulate an impact load of 1,000 lbs. The results were identical to those stated above. It should be noted that forces in the 1,000 to 2,000 lb. range are the forces typically seen at the hoof of a horse running on a hard track.

The present invention may also take the form of the pads 30, 32, and 34 shown in FIGS. 7, 8 and 9 respectively. Each consists of a shock absorbing layer of material identical to that used to form the shock absorbing layer 12 and stabilized by a fabric layer of the same material as the fabric layer 14. In FIG. 7 the pad 30 includes a shock absorbing layer 36 which is wedge-shaped. In plan view it is square, but in elevation view one side is thicker than the other. The pad 30 may be used by installing it in the manner described below with the thickest portion under the heel and tapering toward the front.

In FIG. 8 the pad 32 includes shock absorbing layer 38 which has a raised central portion 40. In plan view (not shown) the pad of FIG. 8 is square and is generally in the shape of a square pyramid. The pad 34 illustrated in FIG. 9 in cross-sectional elevation view has a shock absorbing layer 42 with a recessed central portion 44. In plan view the shock absorbing layer 42 is square and the recess area takes the form of a pyramid.

The pads 30, 32, and 34 illustrated in FIGS. 7, 8 and 9 are used in a different manner from those illustrated in FIGS. 1-5. Specifically, the pads 30, 32, and 34 are first trimmed to fit within the hoof wall, preferably with approximately ¼ inch clearance between the inside of the hoof wall and the outside perimeter of the pad. The pad is free floating within the hoof, as shown by way of example in FIG. 6. The pad 34 is there shown trimmed to fit within the hoof and held in place only by a sheet of material which may be the pad 10 which is in turn held in place by the shoe 18 and nails 22. By mounting the pads 30, 32, and 34 freely within a cavity defined by the hoof wall, frog and a sheet of material covering the bottom of the hoof, the pads may adjust themselves to the applied loads. The peripheral gap allows the pads to spread laterally under load, thereby to absorb the applied shocks.

Thus it is clear that the present invention provides a new and improved pad for use in treating shod animals. The pad, e.g. pad 10, is formed of an elastomeric material of surprising shock absorbing efficiency and stabilized by a fabric layer 14 molded to one surface of the elastomeric material. The pad 10 may be essentially planar and used between the hoof and shoe of the animal. The pad 10 may also have a raised central portion (FIG. 8), a recessed central portion (FIG. 9), or may be wedge-shaped (FIG. 7). Pads of these latter shapes are trimmed to fit within the hoof wall with a gap around the periphery thereof. These pads are held in place by a sheet of material, preferably a horse shoe pad of the type disclosed in FIGS. 1–5, which is placed under the hoof and extends rearward as far as the heel.

The following is claimed:

1. A horse shoe pad comprising a shock absorbing layer of flexible polyurethane of essentially linear structure containing unsatisfied hydroxyl groups, having a compression set of less than 15%, and a recovery which is delayed after compression by at least 0.7 second, and stabilizing means for stabilizing a surface of said shock absorbing layer, said stabilizing means including a fabric layer bonded to one side of said shock absorbing layer.

2. The horse shoe pad of claim 1 wherein said fabric layer is nylon.

3. The horse shoe pad of claim 2 further including a base layer bonded to the opposite side of said shock absorbing layer, said base layer including a polyurethane having a durometer of approximately 60 on the D scale.

4. The horse shoe pad of claim 3 wherein said stabilizing means includes a second fabric layer bonded between said shock absorbing layer and said base layer.

5. The horse shoe pad of claim 1 wherein said stabilizing means includes nylon fabric layers bonded to both sides of said shock absorbing layer.

6. The horse shoe pad of claim 1 wherein said shock absorbing layer includes a raised central portion.

7. The horse shoe pad of claim 6 wherein said shock absorbing layer is pyramidal.

8. The horse shoe pad of claim 1 wherein said shock absorbing layer has a central depression.

9. The horse shoe pad of claim 8 wherein said central depression is pyramidal.

10. The horse shoe pad of claim 1 wherein said shock absorbing layer has a wedge shape.

11. The horse shoe pad of claim 1 wherein said shock absorbing layer is essentially planar and has a marginal portion securable and operable between the horse shoe and the horny part of the animal's hoof to absorb shocks.

12. A method of treating a shod animal comprising the step of free floating a resilient pad of non-porous shock absorbing material within the hoof wall of a hoof of the animal between the frog of the hoof and a sheet of material secured to the hoof and extending from the outer perimeter of the hoof to the back of the heel.

13. The method of claim 12 wherein said step of free-floating a resilient pad includes the usage of a resilient pad trimmed to leave a continuous gap between the pad perimeter and the interior hoof wall.

14. The method of claim 12 wherein the step of free-floating a pad includes the usage of a pad with a raised central portion.

15. The method of claim 12 wherein the step of free-floating a pad includes the usage of a pad with a central depression.

16. The method of claim 12 wherein the step of free-floating a pad includes the usage of a pad with a wedge shape.

17. The method of claim 12 wherein the utilized pad is formed of flexible polyurethane having a compression set of less than 15%, and a recovery which is delayed after compression by at least 0.7 second.

18. The method of claim 17 wherein the utilized pad includes a stabilizing fabric layer bonded to one side of the pad.

19. The method of claim 12 wherein the utilized sheet of material includes a shock absorbing layer of flexible polyurethane of essentially linear structure containing unsatisfied hydroxyl groups, having a compression set of less than 15%, and a recovery which is delayed after compression by at least 0.7 second, and a stabilizing fabric layer bonded to one side of the shock absorbing layer.

20. A horse shoe pad comprising a shock absorbing layer of flexible polyurethane of essentially linear structure containing unsatisfied hydroxyl groups, having a compression set of less than 15%, and a recovery which is delayed after compression by at least 0.7 second, stabilizing means for stabilizing a surface of said shock absorbing layer, said stabilizing means including a fabric layer bonded to one side of said shock absorbing layer, an upper layer of polyurethane bonded to an upper surface of said shock absorbing layer, said fabric layer being bonded to a lower surface of said shock absorbing layer, and a base layer bonded to said fabric layer, said base layer and said upper layer being both formed of polyurethane having a hardness of approximately 60 on the D scale.

* * * * *